United States Patent Office 3,175,918
Patented Mar. 30, 1965

3,175,918
POROUS REFRACTORY BODIES AND THE
MANUFACTURE THEREOF
John J. McGahan, Grand Island, N.Y., and Raymond A.
Caine, Nahant, Mass., assignors to The Carborundum
Company, Niagara Falls, N.Y., a corporation of
Delaware
No Drawing. Filed Oct. 7, 1960, Ser. No. 61,108
12 Claims. (Cl. 106—41)

This invention relates to porous refractory bodies and methods of manufacturing the same and also to the raw batch mixtures employed in such manufacture.

The present application is a continuation-in-part of application Serial No. 770,907, filed October 31, 1958, and entitled Porous Bodies of Controlled Densities and Methods of Making Them.

Many of the known refractories, and particularly those of the bonded and self-bonded types, which are usable for relatively high temperatures, are quite dense and heavy. As a consequence, they are not usable for many installations where weight is an important factor. They are also not usable in many installations where porosity and, more specifically, relatively uniform porosity, is desired. Accordingly, the present invention is directed to the provision of (a) lightweight refractory materials that are simple to manufacture in a wide variety of shapes, (b) porous refractory materials of substantially uniform density and which, at the same time, have sufficient structural strength to permit handling, shipping, machining and use in various environments, (c) lightweight refractory materials suitable for thermal insulating and nuclear shielding, and (d) refractory materials having low bulk density, good insulating properties, high strength to weight ratio, high corrosion resistance, high temperature resistance and good strength at relatively high temperatures. Also, it is an object of the present invention to provide a method for manufacturing refractory products of the character just mentioned.

In accordance with this invention, finely divided particles of a refractory material, such as silicon carbide, boron carbide, or any of the hard metallic carbides, nitrides, borides or silicides, or materials capable of reacting during the process to form a hard metallic carbide, nitride, boride or silicide, are mixed with a carbonaceous binder, such as a synthetic resin or a compound of resins, and a pore-forming material, such as small resinous spheres, foaming agents, skeletal graphite or the like, and the mixtures formed to a suitable shape and then heated. The heating is first carried at least to the point of baking the mixture so that it will retain its shape or to the point of setting the binder. In the same operation or in a separate one, the heating then is carried to the point where the binder and/or the pore-forming materials are carbonized. In some instances, the carbonizing step may be omitted as a separate step, but, in any event, the baked mix is subjected to a maturing step in which a chemical reaction occurs between the carbon residue of the resins and a reactant embodied in the mix initially or supplied during the maturing operation. For example, when the product sought is a porous silicon carbide article, the silicon to be reacted with the carbonaceous residue may be embodied in the mix initially or it may be supplied during the maturing operation. Moreover, this maturing step may be utilized to supply all of the metallic carbide, boride, nitride or silicide in the final product as the metal may be supplied in the mix as an oxide and reacted in the final maturing step.

A large number of porous refractory bodies are encompassed within the scope of this invention and may be manufactured by the methods described herein. For example, cellular or refractory porous bodies can be made in which the principal constituent is a carbide, a boride, a nitride or a silicide. Cellular or porous refractory bodies of silicon carbide, tungsten carbide, tantalum carbide, titanium carbide, niobium carbide, molybdenum carbide, hafnium carbide, boron carbide and chromium carbide have been made and satisfactory results obtained. Also, bodies embodying zirconium carbide or uranium carbide or thorium carbide may be made in accordance with this invention. Porous refractory bodies embodying borides, nitrides or silicides of many of these same metals can be made in accordance with this invention. Porous refractory bodies of the borides of titanium, zirconium, tantalum and niobium have been made with satisfactory results. The same is true in respect of the nitrides of titanium and zirconium and the silicides of tungsten and molybdenum.

While, as indicated, the present invention may be utilized in making foamed or porous or cellular refractory bodies embodying any of the carbides, borides, nitrides or silicides mentioned above, the invention will be initially described herein in respect of the manufacture of cellular or porous silicon carbide refractory articles.

FOAMED OR POROUS SILICON CARBIDE ARTICLES

In accordance with our invention, as applied to the manufacture of foamed or cellular silicon carbide articles, a mix is first prepared containing the necessary ingredients, namely, the silicon carbide grit, a resin binder, and a pore-forming material which may be in the form of small phenolic resin spheres, such as those sold under the trade name "Microballoons," or suitable foaming agents. The mix is then formed into the desired shape and, if foaming agents are utilized, the foaming of the mix is allowed to take place. The mix is then heated so as to set the binder, although it is not necessary to heat the mix in order to set the binder in advance of the succeeding carbonizing step. The two steps can be performed at the same time. Also, the subsequent maturing step can be performed at the same time but it is generally preferable to conduct that operation separately. Ordinarily, after the mix has been baked at a suitable temperature, the baked article is then transferred to a retort for carbonizing and the formed mix is subjected to a suitable temperature to carbonize the binder and the pore-forming material, irrespective of whether it is in the form of phenolic spheres or foam forming resins. Both the resin binder and the residues of the foaming agents are carbonized. Thereafter the article or piece is subjected to a siliconizing operation. This may be done by a vapor-solid state reaction or, if desired, the silicon can be included in the mix and the siliconizing operation carried out at suitable temperatures following the carbonizing step mentioned above. The carbonizing step, as an individual step, may be eliminated and the foamed product matured satisfactorily by taking the baked articles and subjecting them to the final maturing operation which, of course, would involve the carbonizing and siliconizing of the bond.

As is indicated above, the important steps involved are the following:

(a) The preparation of a cellular or porous resinous mass containing silicon carbide grain.

(b) Heating to carbonize the resinous material.

(c) Subsequent conversion of the carbon residue into silicon carbide by a vapor-solid state reaction or by supplying silicon in the mix.

(d) Instead of the reaction specified in (c), an oxide, such as silicon dioxide, can be mixed in the resinous mass and, with a suitable thermal cycle, it may be converted with the carbon residue to silicon carbide.

Various different mixes can be employed, depending upon the density desired, the strength desired, and other requirements which will depend upon the particular use to which the article is to be put.

The following Mix No. 1 is illustrative of a mix which may be utilized in the production of a light or low density product. A product made from Mix No. 1 will have a density in the range of from about 0.25 to 0.30 gram per cubic centimeter and a compressive strength of approximately 75 p.s.i.

Mix 1

| Material: | Percent by weight |
|---|---|
| Phenolic resin 1128B | 21.5 |
| Epoxide resin 201 | 10.0 |
| Maleic anhydride | 1.0 |
| Dimethyl formamide | 5.2 |
| Silicon carbide 1000 grit Norway | 30.3 |
| Silicon 200 mesh | 22.0 |
| Polymethylene polyphenyl isocyanate | 10.0 |

Phenolic resin 1128B is a phenol-formaldehyde resin. Epoxide resin No. 201 is an epoxide resin. The polymethylene polyphenyl isocyanate is an isocyanate and sold under the trademark "PAPI."

Another mix referred to herein as Mix 2 is suitable for providing a relatively high density of from approximately 0.5 to 0.6 grams per cubic centimeter and the resulting product has a compressive strength of approximately 750 p.s.i. Mix 2 is as follows:

Mix 2

| Material: | Percent by weight |
|---|---|
| B328 phenolic resin | 20.1 |
| Epoxide resin 201 | 10.0 |
| Maleic anhydride | 1.0 |
| Dimethyl formamide | 5.0 |
| Acetone | 4.2 |
| Silicon carbide 1000 grit Norway | 29.0 |
| Silicon 200 mesh | 21.2 |
| Polymethylene polyphenyl isocyanate | 9.5 |

Products made using the mixes stated above have been found to have a sustained working temperature in an oxidizing atmosphere of 3000° F. and in an inert atmosphere of 4000° F. The low density product has been found to have a compressive loading at 20° C. of 85 p.s.i. and the high density product has been found to withstand such a compressive loading of 750 p.s.i. The tensile strength at 20° C. of the low density product is approximately 30 p.s.i. and of the high density product 70 p.s.i. The porosity of the low density product has been found to be about 90% and of the high density product about 80%. The thermal expansion coefficient (in./° F.×10$^{-6}$) for these products is 1.99 at 800° F., 2.43 at 1470° F., 2.80 at 2200° F. and 2.91 at 2450° F.

As indicated above, various other mixes can be used and entirely satisfactory results obtained. Mixes 3 and 4, set forth below, which employ the isocyanate-epoxy-phenolic system, as do the mixes described above, have been found to give good results.

Mix 3

| Material: | Quantity |
|---|---|
| Phenolic resin 1128B | grams__ 485 |
| Epoxide resin EP201 | do____ 225 |
| Pyromellitic dianhydride | do____ 22.5 |
| Silicon carbide 1000 grit | do____ 675 |
| Silicon −325 mesh | do____ 500 |
| Polymethylene polyphenyl isocyanate | do____ 168 |
| DMP 30 (dimethylamino methyl) phenol | cc__ 8 |

Mix 4

| Material: | Quantity |
|---|---|
| Phenolic resin 1128B | grams__ 390 |
| Epoxide resin EP201 | do____ 180 |
| Pyromellitic dianhydride | do____ 18 |
| Silicon | do____ 200 |
| Silicon carbide | do____ 270 |
| Methyl ethyl ketone | cc__ 175 |
| DMP30 (dimethylamino methyl) phenol | cc__ 10 |
| Polymethylene polyphenyl isocyanate | grams__ 180 |

In the above mixes, the methyl ethyl ketone is a non-reactive diluent and the DMP 30 functions as a catalyst for both the isocyanate and the epoxy reaction.

While the isocyanate-epoxy-phenolic system seems to provide good results, entirely satisfactory results can be obtained without the use of the epoxy resin utilizing the isocyanate-phenolic resin system alone. An entirely satisfactory mix without the epoxy resin is as follows:

Mix 5

| Material: | Quantity, grams |
|---|---|
| Silicon carbide 1000 grit Norway | 55 |
| B178 phenolic resin | 38 |
| Polymethylene polyphenyl isocyanate | 7 |
| DMP 30 catalyst | 0.1 |

While we prefer to use the isocyanate-epoxy-phenolic system or the isocyanate-phenolic system, reasonably satisfactory results can be obtained by using other binders and foaming agents.

Also, suitable products for certain purposes can be obtained by utilizing "Microballoons," i.e., thin-walled phenolic resin spheres filled with nitrogen, as the pore-forming material. The "Microballoons" may be mixed with a suitable carbonaceous binder, such as a phenolic resin, and with the silicon carbide grain. After baking and carbonizing, such products may be siliconized and entirely satisfactory results obtained.

The temperatures which are employed in the curing or baking and carbonizing and siliconizing operations will depend upon the particular materials employed. The curing may be carried out at temperatures of around 300° F., the carbonizing at temperatures in the neighborhood of 700 to 1000° F., and the siliconizing at temperatures of around 2100° to 2150° C.

As stated above, various other foamed or cellular carbides, nitrides, borides and silicides can be made in the manner stated. For purposes of further illustrating this invention, we shall describe the making of foamed or cellular titanium carbide.

FOAMED OR CELLULAR TITANIUM CARBIDE

In manufacturing cellular titanium carbide, the mix is first prepared, including the foaming agents. After the foamed mix has been allowed to set up in the appropriate mold, the samples are then preferably baked in an oven at temperatures up to about 325° F. After this heat curing step, the baked mix may be transferred to a retort for carbonizing. This step may be carried out at a temperature of approximately 1000° C. The carbonized product is then given a maturing burn at temperatures up to 2400° C. These temperatures, of course, will vary in accord with the particular materials which are employed.

A typical mix for making titanium carbide is as follows:

Mix 6

| Material: | Quantity |
|---|---|
| No. 328B phenolformaldehyde resin | grams__ 39 |
| Epoxide resin No. 201 | do____ 18 |
| Dimethyl formamide (DMF) | cc__ 10 |
| Acetone | cc__ 10 |
| Lampblack carbon | grams__ 1.7 |
| Titania powder | do____ 45 |
| Polyisocyanate resin | do____ 18 |

After the mix is made, it is poured into a suitable mold and allowed to foam. After foaming, the mix is subjected to a baking action which serves to polymerize the phenol-epoxide resins and to set the mass. The article so formed may then be put directly into a high temperature furnace and matured in one firing. However, it may be preferable, in some instances, to employ several steps. A baking step can be carried out initially. Thereafter, the bodies so formed may be carbonized. Temperatures on the order of 300° C. to 500° C. are employed in the carbonizing step. Thereafter, the articles are subjected to the maturing treatment, in which a chemical reaction is brought about between the titania powder and the carbon. This takes place at a temperature of approximately 1900° C. However, temperatures up to 2100 or 2200° C. may be employed for carrying out this maturing step.

BORIDES, NITRIDES AND SILICIDES

In the manufacture of cellular or foamed borides, a powdered mixture of an oxide, carbon and boron metal is appropriately foamed and heated. The oxides were mixed with the resins with the oxide appropriately proportioned for reduction to metal. Amorphous boron metal was added to the mix in an amount required to combine. Good foamed bodies of various borides have been produced.

In the manufacture of silicide foams, oxides of the particular metals were used and silicon carbide dust was added to the mix in an amount which would allow complete reaction of the oxide with the carbon of the silicon carbide. The proportions were such that the metal oxides were reduced to metal and the silicon was freed from its carbide form. The metals were united with the silicon to form the metallic silicide.

In describing the specific embodiments and steps involving our invention, we have mentioned the phenolic resins as being suitable binders and pore formers. While the phenolformaldehyde resins are preferred, many others may be used without departing from our invention. Various epoxies, polyesters, epoxy-modified phenolics, furanes, aminos and the like resins may be employed. The resin or resins selected should fire to a relatively clean carbon residue. The foaming agents, when used, likewise should be selected so that the constituents remaining will fire to a carbon residue or a residue which will not interfere with the maturing reactions described above.

The products made in accordance with this invention will have varying properties, depending upon the particular materials employed. However, by following the teachings stated above, it is possible to make foamed or cellular products which are low in bulk density, have high insulating properties, high strength to weight ratios, high corrosion resistance, high temperature resistance and high strength at elevated temperatures.

The products made according to the present invention may be utilized for various purposes. For example, they may be used for insulation back-ups on nose cones, leading edges, rocket nozzles, jet aircraft afterburners, dummy loads in wave guides, refractory bricks, glass tank liners, kiln liners, induction furnaces, resistors, heat exchangers, insulation for gas cooled reactors, filters for liquids or gases, grinding wheels, stove burner plates, hot tops for ingot molds, etc.

The terms "metals" and "metallic" are used herein to specify materials selected from the group consisting of silicon, boron and metals of Groups IV, V, and VI of the periodic table. The term "refractory material" as used herein is intended to cover not only materials selected from the group consisting of metallic carbides, nitrides, borides and silicides, but also materials capable of reacting during heating to form a metallic carbide, nitride, boride or silicide, such as metallic oxides.

The term "carbonaceous" is used herein to designate a material that is a supplier of carbon and that preferably is carbon or a compound containing carbon and hydrogen and/or other volatile constituents. The term "carbonizable" is used to specify materials which, upon firing at temperatures at and above their decomposition temperatures, will deposit carbon. Carbonizing temperatures for many of the thermosetting synthetic resins are in the range of 800° C. to 1000° C.

While the invention has been described is connection with specific embodiments and has been somewhat generally described herein, it will be understood that further modifications thereof over and above those which are specifically mentioned are possible without departing from the spirit and scope of the invention. More specifically, the invention may be practiced or embodied within the scope of the appended claims and any and all equivalents.

We claim:

1. A method of manufacturing porous, self-bonded refractory bodies wherein solely an internal source of carbon is utilized for the desired bond-forming reaction and consisting essentially of the steps of mixing together finely divided particles of a refractory bond-forming material selected from the group consisting of silicon, boron, carbides of silicon and boron, oxides of metals of Groups IV, V, and VI of the periodic table, and mixtures thereof, a carbonaceous resin binder capable of being fired to a relatively clean carbon residue, and a carbonizable foaming agent, forming the mixture to a desired shape, foaming the mixture, heating the foamed shape to a sufficient extent to cure and carbonize the binder and foaming agent thereby forming a porous carbon residue in said foamed shape, and maturing the carbonized shape at a temperature in the range of between about 1800° C. and about 2400° C. to react said carbon residue and said refractory bond-forming material thereby forming said porous, self-bonded refractory body having a low bulk density.

2. The method as defined in claim 1 in which said foamed shape is first heated to a temperature sufficient only to set the binder before carbonizing said shape.

3. The method as defined in claim 1 in which said carbonaceous binder is a phenolic resin.

4. The method as defined in claim 1 in which said carbonaceous resin binder is a mixture of a phenolic resin and an epoxy resin.

5. A method as defined in claim 1 in which said foaming agent is a polyisocyanate.

6. The method of manufacturing a porous, self-bonded refractory carbide body wherein solely an internal source of carbon is utilized for the desired bond-forming reaction consisting essentially of the steps of mixing together finely divided particles of an oxide of one of the metals of Groups IV, V, and VI of the periodic table, a carbonaceous resin binder capable of being fired to a relatively clean carbon residue, and a carbonizable foaming agent, forming the mixture into a desired shape, foaming the mixture, heating the foamed mixture to a sufficient extent to first set the binder and thereafter carbonize the binder to form a porous carbon residue and thereafter maturing the carbonized body at a temperature in the range of about 2100° C. to about 2400° C. to react the carbon residue and the metal of said metal oxide thereby forming a porous, self-bonded refractory carbide body having low bulk density.

7. The method of forming a porous, self-bonded refractory boride body wherein solely an internal source of carbon is utilized for the desired bond-forming reaction, consisting essentially of the steps of mixing together finely divided particles of an oxide of one of the metals of Groups IV, V, and VI of the periodic table, a carbonaceous resin binder capable of being fired to a relatively clean carbon residue, a carbonizable foaming agent and boron metal, forming the mixture into a desired shape, foaming the mixture, heating the foamed mix to a sufficient extent to first set the binder and thereafter carbonize the binder to form a porous carbon residue, and thereafter maturing the carbonized body at a temperature sufficient to react the metal of said oxide with the boron metal thereby forming a porous, self-bonded refractory boride body having low bulk density.

8. The method of forming a porous, self-bonded refractory silicide body wherein solely an internal source of carbon is utilized for the desired bond forming reaction, consisting essentially of the steps of mixing together finely divided particles of a metal oxide selected from the group consisting of tungsten and molybdenum oxides, a carbonaceous resin binder capable of being fired to a relatively clean carbon residue, a carbonizable foaming agent, and finely divided silicon carbide, forming the mixture into a desired shape, foaming the mixture, heating the foamed mixture to a sufficient extent to first set the binder and thereafter carbonize the binder to form a porous carbon residue, and thereafter maturing the carbonized body at a temperature sufficient to reduce the metal oxide to metal and free the silicon from its carbide form whereby the metal and silicon react to form a porous, self-bonded refractory silicide body having low bulk density.

9. A method of manufacturing a porous, self-bonded silicon carbide body wherein solely an internal source of carbon is utilized for the desired bond-forming reaction, consisting essentially of mixing together a finely divided material selected from the group consisting of silica, silicon carbide and mixtures thereof, a carbonaceous resin binder capable of being fired to a relatively clean carbon residue, a carbonizable foaming agent and finely divided silicon, forming the mix into a desired shape, foaming the mix, heating the foamed mix to a sufficient extent to first set the binder and thereafter carbonize the binder to form a porous carbon residue, and maturing the carbonized body at a temperature sufficient to react the silicon and carbon thereby forming a porous, self-bonded silicon carbide body having low bulk density.

10. The method as defined in claim 9 in which said foaming agent is a polyisocyanate.

11. The method as defined in claim 9 in which said carbonaceous resin binder is a mixture of a phenolic resin and an epoxy resin.

12. A porous refractory body consisting essentially of self-bonded silicon carbide having a porosity of between about 80% and 90% and a density in the range of from about 0.25 to about 0.6 gram per cubic centimeter.

References Cited in the file of this patent

UNITED STATES PATENTS

| | | |
|---|---|---|
| 1,013,701 | Tone | Jan. 2, 1912 |
| 1,266,478 | Hutchins | May 14, 1919 |
| 2,636,828 | Nicholson | Apr. 28, 1953 |
| 2,784,112 | Nicholson | Mar. 5, 1957 |
| 2,797,201 | Veatch et al. | June 25, 1957 |
| 2,887,393 | Taylor | May 19, 1959 |
| 2,906,717 | Sekmakas | Sept. 29, 1959 |
| 2,908,553 | Frank | Oct. 13, 1959 |
| 2,917,384 | Grandey | Dec. 15, 1959 |
| 2,938,807 | Andersen | May 31, 1960 |

FOREIGN PATENTS

| | | |
|---|---|---|
| 716,422 | Great Britain | Oct. 6, 1954 |